United States Patent [19]

Patel

[11] Patent Number: 4,867,756

[45] Date of Patent: Sep. 19, 1989

[54] REMOVAL OF SULFUR COMPOUNDS IN FLUIDIZED BED CARBONACEOUS SOLIDS GASIFICATION

[75] Inventor: Jitendra G. Patel, Bolingbrook, Ill.

[73] Assignee: Institute of Gas Technology, Chicago, Ill.

[21] Appl. No.: 80,792

[22] Filed: Aug. 3, 1987

Related U.S. Application Data

[63] Continuation-in-part of Ser. No. 865,356, May 20, 1986, abandoned.

[51] Int. Cl.⁴ .............................................. C10J 3/84
[52] U.S. Cl. ..................................... 48/197 R; 48/203; 48/206; 48/210
[58] Field of Search ..................... 48/197 R, 202, 206, 48/203, 209, 210; 202/373

[56] References Cited

U.S. PATENT DOCUMENTS

| | | | |
|---|---|---|---|
| 2,906,608 | 9/1951 | Jéquier et al. | 48/206 |
| 3,847,563 | 11/1974 | Archer et al. | 48/206 |
| 3,870,480 | 3/1975 | Moss et al. | 48/206 |
| 3,935,825 | 2/1976 | Matthews et al. | |
| 3,949,684 | 4/1976 | Copeland | 48/197 R |
| 3,969,089 | 7/1976 | Moss et al. | 48/197 R |
| 3,970,434 | 7/1976 | Gasior et al. | |
| 3,977,844 | 8/1976 | Van Slyke | |
| 4,017,272 | 4/1977 | Anwer et al. | 48/197 R |
| 4,057,402 | 11/1977 | Patel et al. | 48/206 |
| 4,085,707 | 4/1978 | Moss | 48/206 |
| 4,229,289 | 10/1980 | Victor | |
| 4,300,914 | 11/1981 | Rice | 48/206 |
| 4,315,758 | 2/1982 | Patel et al. | |

OTHER PUBLICATIONS

Oil and Gas Journal–Aug. 1, 1977, p. 51 et seq.

*Primary Examiner*—Peter Kratz
*Attorney, Agent, or Firm*—Thomas W. Speckman

[57] ABSTRACT

A method for removing sulfur compounds from gasification product gas during gasification of carbonaceous materials in a fluidized bed, agglomerating discharge reactor and converting harmful and unstable sulfur compounds to an environmentally acceptable form for safe disposal. Particulate sulfur fixation agent is introduced into an ash agglomerating fluidized bed gasifier along with carbonaceous feed solids and reacts with gaseous sulfur compounds formed when gasifying feed solids under reducing conditions in the fluidized bed. Unstable sulfur compounds formed by reaction with the fixation agent are then converted to a stable, environmentally disposable, solid in a lower oxidizing portion of the gasifier for discharge with the ash.

32 Claims, 1 Drawing Sheet

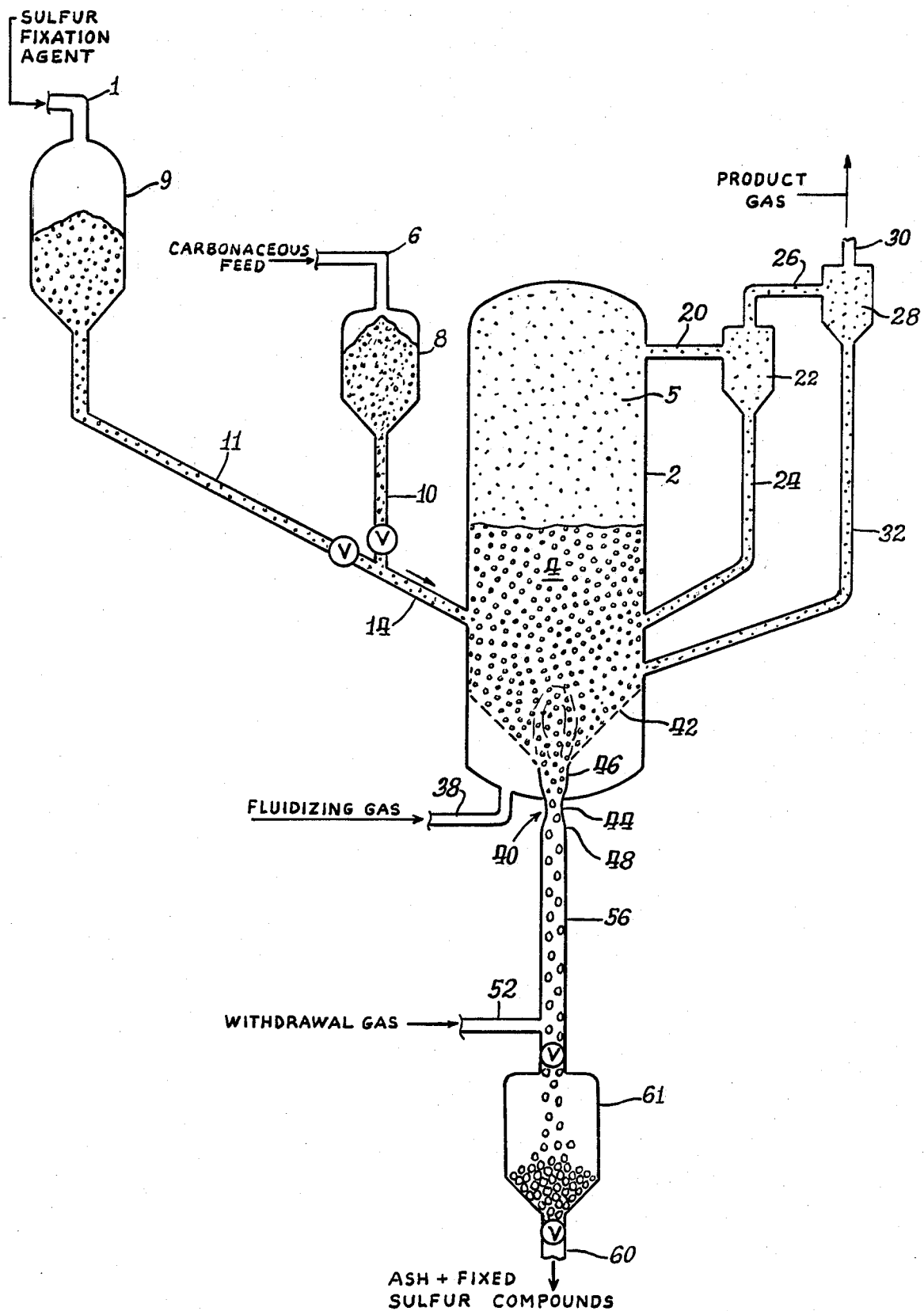

REMOVAL OF SULFUR COMPOUNDS IN FLUIDIZED BED CARBONACEOUS SOLIDS GASIFICATION

BACKGROUND OF THE INVENTION

1. Field of the Invention

The present invention relates to improved gasification of solid carbonaceous materials, such as coal in a fluidized bed. More specifically, this invention relates to reduction of sulfur compounds in product gases by in situ conversion of harmful and/or unstable sulfur compounds formed during gasification to an environmentally acceptable sulfur compound within the fluidized bed and at least one selective solids withdrawal conduit. Solid carbonaceous materials provide an alternative energy source for natural gas and crude oil, but carbonaceous materials such as coal may have a relatively high sulfur content. Sulfur compounds present in the carbonaceous feed material are typically converted to harmful gaseous sulfur compounds during gasification in a fluidized bed reactor. This invention provides removal of such undesired gaseous sulfur compounds by their conversion in the fluidized bed and solids withdrawal conduit to an environmentally acceptable solid form which may be safely discharged with the spent coal solids.

2. Description of the Prior Art

Solid carbonaceous materials such as coal may be gasified by contacting with a steam and oxygen containing gas, such as air, at an elevated temperature generally in the range of about 1400° to 2000° F. and at elevated pressures. Products of the gasification reaction include hydrogen, carbon monoxide, carbon dioxide, hydrocarbons such as methane, and sulfur compounds such as hydrogen sulfide and carbonyl sulfide.

A preferred method for the gasification of coal is the U-GAS Process developed by Institute of Gas Technology in Chicago, Ill. (See the Oil and Gas Journal—Aug. 1, 1977, p. 51 et seq., the teachings of which are incorporated herein by reference) Basic principles and preferred embodiments of this gasification process are disclosed in U.S. Pat. No. 4,315,758, the teachings of which are incorporated herein by reference in their entirety. The U-GAS Process is capable of producing a clean, environmentally acceptable low Btu (about 150–300 Btu/SCF) fuel gas from coal. This gas can be used directly by industrial and commercial users or as a substitute for natural gas or fuel oil. In the form of synthesis gas, the products from the U-GAS Process can be used as a chemical feedstock or as a source of hot reducing gas for reducing metallic ores such as iron ore to the base metal.

The U-GAS Process, as disclosed in U.S. Pat. No. 4,315,758, overcomes problems associated with the agglomeration of ash particles within the fluidized bed gasification zone as taught by patents cited therein, but requires the removal of toxic sulfur compounds from the product gas stream. Sulfur compounds present in the carbonaceous feed material are typically converted primarily to gaseous hydrogen sulfide and carbonyl sulfide during gasification in a fluidized bed reactor. These sulfur compounds must be removed from the product gas stream before it is utilized as fuel gas, or for SNG production, ammonia synthesis, and the like to prevent the formation of toxic sulfur oxides or to avoid poisoning synthesis catalysts. One conventional method for removing sulfur compounds from coal gasification product gas requires cooling of the product gas to approximately ambient temperatures and scrubbing it with a chemical or physical absorbent. This method is undesirable from several standpoints, since it results in a significant loss in process efficiency, it requires extensive equipment, and it generates considerable waste materials.

It is known to remove sulfur oxides from flue gases produced by the combustion of coal by contacting the flue gases with limestone based materials. Finely divided limestone may be injected directly into a combustion furnace at a point somewhat removed from the flame, or particulate limestone or dolomite may be used in a fixed, moving or fluidized bed to contact and absorb sulfur oxide gases contained in a flue gas stream. It is also known that combustion of sulfur bearing coal or oil may be conducted in a fluidized bed of limestone which reacts with sulfur oxide gases produced during the combustion. Coal combustion reaction conditions differ significantly from coal or carbonaceous solids gasification reaction conditions, however, since in combustion reactors an excess of oxygen containing gas is required to promote complete combustion, while carbonaceous solids gasification is carried out under reducing conditions. Since oxidizing conditions are present in a combustion reactor, sulfur compounds present are converted to sulfur dioxide gas which reacts with limestone to produce calcium sulfate, a stable solid material which does not require further processing prior to discharge and disposal.

Introduction of alkaline earth metal oxides, such as calcined limestone or calcined dolomite with the coal feed into a coal gasifier having a flat distributor plate is taught by U.S. Pat. No. 3,969,089 and the patents cited therein to reduce the presence of sulfur compounds in coal gasification product gas. The hydrogen sulfide and carbonyl sulfide gas compounds formed during coal gasification react with the calcium oxide to produce solid calcium sulfide. Calcium sulfide is, however, unstable and decomposes under atmospheric conditions in the presence of water to produce hydrogen sulfide, a poisonous gas. The sulfurized calcined limestone is regenerated in a separate regenerator operated under oxidizing conditions to form sulfur dioxide gas and calcium oxide. This additional process step results in a loss of process efficiency, since it requires a separate reactor and transport of hot solids in water-free condition from one vessel to another and still results in sulfur oxides which are not desired to be released to the atmosphere. U.S. Pat. No. 3,970,434 teaches gasification of coal in admixture with alkaline earth metal oxides for absorption of sulfur and later combustion of the alkaline earth sulfide in a separate unit. U.S. Pat. No. 3,977,844 teaches gasification of coal in the presence of an oxide, hydroxide, bicarbonate or carbonate of an alkali or alkaline earth metal forming a metal sulfide which is transferred to a separate reactor for conversion to gaseous hydrogen sulfide which may be utilized in Claus process technology.

SUMMARY OF THE INVENTION

It is an object of the present invention to provide a process for removal of sulfur compounds released during gasification of carbonaceous materials in a fluidized bed by conversion of harmful and/or unstable sulfur compounds to environmentally acceptable sulfur compound within the fluidized bed and selective solids withdrawal conduit in a single reaction vessel.

It is another object of the present invention to provide gasification of carbonaceous materials in an agglomerating discharge fluidized bed, conversion of gaseous sulfur compounds formed during gasification to solid sulfur compounds in the main body of the fluidized bed and conversion of unstable solid sulfur compounds to stable solid sulphur compounds in the agglomerating discharge region of the fluidized bed and discharging them with ash.

The process of the present invention may utilize any suitable ash agglomerating type fluidized bed gasifier, such as the types taught in U.S. Pat. Nos. 3,935,825; 4,229,289; and 4,315,758, the teachings of which are incorporated by reference herein in their entirety. Carbonaceous feed solids of the type which may be gasified forming an ash residue may be injected into a pressurized fluidized bed gasifier through a lockhopper system. Within the fluidized bed, the carbonaceous solids react with steam and an oxygen containing gas and are gasified rapidly to produce a product gas mixture comprising hydrogen, carbon monoxide, carbon dioxide, water, methane, hydrogen sulfide, carbonyl sulfide and trace impurities. Gasification is carried out at temperatures depending principally upon the type of carbonaceous feed material and the temperature required to maintain non-slagging conditions for ash, generally about 800° to about 2000° F. The fluidized bed gasifier is pressurized to about 15 to 750 psi, depending upon the type of carbonaceous feed material and the ultimate use of the product gas. For example, for production of an industrial fuel, minimum pressures of about 20 to about 50 psi are most desirable. Reducing conditions are maintained throughout a major portion of the fluidized bed due to the production of hydrogen and low oxygen content of the fluidizing gas. As a result of the reducing conditions, nearly all the sulfur present in the carbonaceous feed material is converted to gaseous hydrogen sulfide and carbonyl sulfide. The ratio of hydrogen sulfide to carbonyl sulfide is typically about 20:1.

Fluidizing gas, comprising steam and little or no oxygen containing gas, 0 to about 25 volume percent, is introduced into the fluidized bed gasifier through a perforated sloping grid gas distributor plate below the fluidized bed. Withdrawal gas having a high oxygen content, about 5 to about 90 volume percent, is introduced into the fluidized bed gasifier through a solids withdrawal means comprising a venturi classifier system located at low areas of the distributor plate. The withdrawal gas will always have a substantially higher oxygen content than the fluidizing gas. When referring to "oxygen content" or "oxygen containing gas" throughout the description and claims, I mean oxygen available for combustion. For example, oxygen contained in air is available for combustion while oxygen contained in steam is not available for combustion. The ratio of oxygen to steam in the two gas introduction conduits is carefully monitored and controlled to maintain the above oxygen content relationships, with the gas introduced into the venturi classifier having a substantially greater ratio of oxygen to steam. Accordingly, a higher temperature is maintained in the central portion at the base of the bed to promote agglomeration of high ash concentration particles which are removed by gravity through the venturi classifier and discharged from the bed. This type of ash agglomerating fluidized bed gasifier achieves a low level of carbon loss in the discharge ash and provides high overall carbon conversion, 95 percent or greater in the case of coal. Fines withdrawn with the product gas from the headspace of the gasifier may be separated from the product gas in any suitable gas-solids separator and the fines are returned to the fluidized bed gasifier.

According to the process of the present invention, a sulfur fixation agent is introduced into the fluidized bed gasifier along with carbonaceous feed materials to provide removal of sulfur compounds formed from the carbonaceous feed during gasification and fixation of sulfur in a solid state which is environmentally acceptable and which may be safely disposed. Sulfur fixation agents suitable for use in the process of the present invention include limestone, dolomite, metallic carbonate compounds, metal oxide compounds, and combinations thereof. Crushed limestone is a preferred sulfur fixation agent, since it is readily available, abundant and relatively inexpensive. Sulfur fixation agent, such as crushed limestone, may be stored in a separate feed lockhopper, mixed with carbonaceous feed solids in a common feed conduit, and injected into the fluidized bed gasifier. The amount of sulfur fixation agent introduced into the gasifier with the carbonaceous feed material is determined by the amount of sulfur present in the carbonaceous feed. Molar ratios of metal, such as calcium, in the sulfur fixation agent to sulfur in the carbonaceous feed are suitably about 1 to about 5, and preferably about 1.5 to about 3. The desired particle size of the sulfur fixation agent is selected so that the sulfur fixation agent particles have approximately the same retention time in the fluidized bed gasifier as the carbonaceous feed, and so that the sulfur compound solid particles are discharged with the ash agglomerates through the venturi classifier at the base of the fluidized bed.

Using crushed limestone as the sulfur fixation agent, the limestone ($CaCO_3$) decomposes to solid calcium oxide and gaseous carbon dioxide shortly after introduction into the gasifier due to the high temperatures in the fluidized bed. The solid calcium oxide then reacts with the sulfur compounds formed from the carbonaceous feed materials, gaseous hydrogen sulfide and carbonyl sulfide, according to the following reactions:

$$CaO(s) + H_2S(g) \rightarrow CaS(s) + H_2O(g)$$

$$CaO(s) + COS(g) \rightarrow CaS(s) + CO_2(g)$$

The gaseous sulfur compounds formed from the carbonaceous feed materials are thus converted to solid calcium sulfide due to the reducing conditions prevailing in the major portion of the fluidized bed. Substantially complete thermodynamic conversion of hydrogen sulfide and carbonyl sulfide to calcium sulfide is achieved in the fluidized bed gasifier since the gaseous products of coal gasification are intimately mixed with excess limestone in the fluidized bed.

The conversion of hydrogen sulfide and carbonyl sulfide to calcium sulfide is limited by the partial pressure of steam within the fluidized bed gasifier, and it is therefore desirable to reduce the partial pressure of steam in the gasification product gas to achieve substantially complete conversion to calcium sulfide of sulfur compounds formed during gasification. In addition, the desired equilibrium of conversion of gaseous sulfur compounds is favored by lower temperatures and higher hydrogen sulfide concentrations. The efficiency of conversion of gaseous sulfur compounds to calcium sulfide is therefore higher for carbonaceous feed materials having a high sulfur content and requiring lower operating temperatures.

As calcium sulfide solids move through the fluidized bed downwardly toward the base of the bed and the selective ash agglomerating discharge, they encounter an oxidizing atmosphere at the base of the bed and in the selective withdrawal conduit which results from relatively high levels of oxygen introduced through the venturi classifier withdrawal conduit to promote ash agglomeration. As the calcium sulfide moves through this hot, oxidizing zone at the base of the fluidized bed and in the upper portion of the withdrawal conduit, calcium sulfide is fixed by reaction with oxygen to produce calcium sulfate according to the reaction:

$$CaS(s) + 2O_2(g) \rightarrow CaSO_4(s)$$

The temperature, retention time and oxidizing atmosphere is such at the base of the fluidized bed and in the upper portion of the elective venturi solids withdrawal conduit that substantially all calcium sulfide is converted to calcium sulfate, which is a solid, stable, environmentally acceptable compound which may be released as a solid from the discharge conduit along with agglomerated ash and unreacted limestone. The calcium sulfate may be discarded along with the ash agglomerates and unreacted limestone since the sulfur has been fixed and exists in a form which does not pose any threat to the environment.

BRIEF DESCRIPTION OF THE DRAWING

The above mentioned and other features of the present invention, and the manner of obtaining them, will become apparent and the invention will be best understood by reference to the following description of preferred embodiments read in conjunction with the accompanying drawing, which schematically shows a fluidized bed gasifier apparatus suitable for use in one embodiment of the process of the present invention.

DESCRIPTION OF PREFERRED EMBODIMENTS

As shown in the figure, fluidized bed gasifier 2 comprises a single stage fluidized bed gasification reactor which may be operated at temperatures from about 800° to about 2000° F. and preferably from about 1400° to 2000° F., and pressures from about 15 to about 1000 psi.

Carbonaceous feed materials suitable for use in the process of the present invention may comprise any sulfur containing carbonaceous material susceptible to gasification in a fluidized bed of the agglomerating ash discharge type including different types and grades of coal, oil shale, petroleum coke, peat, lignite, solid waste, municipal solid waste, refuse derived fuel, refinery and sewage plant sludges, and solid biomass materials. Coal is an especially preferred carbonaceous feed material, and will be referred to exclusively in the following detailed description of preferred embodiments without limiting the process of the present invention with respect to suitable carbonaceous feed solids. Crushed coal is conveyed through solids feed line 6 from supply storage to feed lockhopper 8 prior to introduction into fluidized bed gasifier 2. Prior pretreatment and/or devolatilization of coal solids is not necessary. Feed solids are generally crushed to achieve particle sizes of average diameters less than about ¼ inch.

Sulfur fixation agent may be pre-mixed with the coal or preferably conveyed from supply storage through feed line 7 to lockhopper 9 prior to introduction into fluidized bed gasifier 2. Sulfur fixation agent may also be fed to the fluidized bed separately from the coal by any suitable feeding means, such as a lockhopper feed system. Suitable sulfur fixation agents include limestone, dolomite and other metallic carbonate compounds such as siderite, metal oxide compounds such as oxides of iron and zinc, and mixtures thereof. Limestone is an especially preferred sulfur fixation agent, and will be referred to exclusively hereafter as the sulfur fixation agent, without limiting the process of the present invention with respect to suitable sulfur fixation agents. Limestone is crushed to achieve particle sizes such that the limestone particles have approximately the same retention time in the fluidized bed reactor as the coal particles, and the size and density of limestone particles is such that limestone is discharged along with ash agglomerates through the venturi discharge classifier in the lower region of fluidized bed 4. Limestone is generally crushed to obtain particle sizes of average diameters of less than about 1/16 inch. Limestone particles are conveyed from lockhopper 9 through conduit 11 and mixed with coal solids in mixed solids conduit 14 and injected into fluidized bed 4 therefrom. The amount of limestone introduced into fluidized bed 4 is determined by the amount of sulfur present in the coal solids. Limestone is added in an amount to achieve molar ratios of calcium to sulfur of preferably about 1:1 to about 5:1 and most preferably about 1.5:1 to about 3:1.

Fluidized bed 4 is in a central section within gasifier 2 wherein coal and limestone particles are fluidized by a fluidizing gas comprising steam and low content oxygen containing gas. Fluidizing gas is introduced below fluidized bed 4 through fluidization gas inlet 38 and is distributed to fluidized bed 4 through perforated sloping grid 42. The composition of the fluidizing gas is low in or void of oxygen to provide reducing conditions throughout the major portion of the body of the fluidized bed. The oxygen concentration in the fluidizing gas is suitably 0 to about 21 volume percent, preferably 0 to about 15 volume percent. The oxygen content of the fluidizing gas is substantially, more than about 5 volume percent and preferably more than about 7 volume percent, less than the oxygen content of the withdrawal gas. As sulfur containing carbonaceous solids are gasified in fluidized bed 4, sulfur compounds are released from the carbonaceous solids principally in the form of gaseous hydrogen sulfide and carbonyl sulfide. The calcium carbonate in the limestone particles react with the gaseous hydrogen sulfide and carbonyl sulfide under the reducing conditions of fluidized bed 4 to form solid calcium oxide and gaseous carbon dioxide. The solid calcium oxide circulates in fluidized bed 4 and reacts with substantially all gaseous hydrogen sulfide and carbonyl sulfide to yield solid calcium sulfide, water and carbon dioxide due to the reducing conditions within the major portion of the body of fluidized bed 4. The velocity of the withdrawal gas introduced is adjusted to provide solids residence times of about 20 minutes to about 3 hours, and preferably about ½ to about 1½ hours in fluidized bed 4. Solid limestone particles with fixed calcium sulfide and solid carbonaceous material ash particles, after a suitable residence time in fluidized bed 4, migrate to the base of fluidized bed 4 and to the upper portion of selective withdrawal conduit where they are subjected to a higher temperature oxidizing atmosphere where essentially all of the calcium sulfide is converted to calcium sulfate and ultimately discharged through venturi classifier 40 and withdrawal conduit 56.

Selective venturi solids classifier 40 comprises an upward extending expanding conical section 46, a constricted central section 44 and a downwardly expanding conical section 48, and entry to upward conical section 46 is positioned in a lower portion of sloping grid 42. A solids withdrawal gas comprising steam and an oxygen containing gas is introduced through gas inlet 52 into lower withdrawal conduit 56 below venturi classifier 40. The solids withdrawal gas comprises a relatively high oxygen concentration in the range of about 5 to about 90 volume percent oxygen, preferably about 10 to about 70 volume percent oxygen to provide an oxidizing atmosphere within selective solids classifier 40 and in the lower base portion of fluidized bed 4. The oxygen content of the withdrawal gas is substantially more than about 5 volume percent and preferably more than about 7 volume percent, greater than the oxygen content of the fluidizing gas. In this way, higher temperatures are maintained in the lower zone of the base of fluidized bed 4 to promote agglomeration of high ash concentration particles formed by gasification of the carbonaceous feed at near the incipient softening temperature of the ash particles. The ash particles agglomerate until their mass can no longer be supported by the upflowing withdrawal gas passing through selective withdrawal classifier 40, and the ash agglomerates are then discharged by gravity through selective withdrawal classifier 40 and withdrawal conduit 56. The solids are then discharged through reactor discharge conduit 60 passing from any suitable pressure reducing means, such as an appropriate lockhopper 61. The high temperature zone at the base portion of fluidized bed and in upward extending conical section 46 of selective withdrawal conduit 40 wherein oxidizing conditions prevail promotes the reaction of calcium sulfide with molecular oxygen to produce calcium sulfate. Oxidizing conditions are such in upward extending conical section 46 and in the base of fluidized bed that substantially all calcium sulfide is converted to calcium sulfate fixed in the limestone particles which are of suitable density/size to be discharged through selective solids discharge 40 along with the ash agglomerates and unreacted limestone particles. Residence times of particles within the lower oxidizing region of fluidized bed 4 and in upward extending conical section 46 are preferably about 3 to 20 minutes, and most preferably about 5 to 10 minutes.

Gaseous effluent passes through gasifier headspace 5 and is withdrawn from fluidized bed gasifier 2 through gaseous effluent withdrawal conduit 20. Gaseous effluent comprises an admixture of product gases and entrained coal fines, and is conveyed to a suitable solids/gas separator such as first stage cyclone 22. Within cyclone 22, the larger coal fines from about 20 to about 250 microns in diameter are separated from the product gases and returned to fluidized bed 4 through first stage recycle conduit 24. Product gas is then conveyed through first stage effluent conduit 26 to a second solids/gas separator such as second stage cyclone 28, wherein additional fines from about 5 to about 100 microns in diameter are separated from the product gas. These fines are returned to fluidized bed 4 through second stage recycle conduit 32. Product gas free from the major portion of coal fines carried off fluidized bed 4 is conveyed through product gas conduit 30 for utilization as fuel gas, or for SNG production, ammonia synthesis, and the like.

The process of the present invention thus provides removal of sulfur compounds from coal product gas and conversion of harmful and/or unstable sulfur compounds to an environmentally acceptable form in a single ash agglomerating type fluidized bed gasifier. The following example is set forth for the purpose of illustration only and is not intended to limit the present invention in any way.

EXAMPLE

Utah bituminous coal containing about 0.6 wt. percent sulfur (corresponding to about 450 ppm hydrogen sulfide in the gasifier) was gasified according to the process of the present invention in a fluidized bed gasifier substantially as shown in the drawing. For a period of 12 total hours, including 7 hours of steady state operating conditions, crushed coal was introduced into the gasifier at a rate of 1215 lbs/hr and crushed limestone was introduced at a rate of 65 lbs/hr. Coal feed had an average size of 6 mesh U.S. Sieve Size and the limestone feed had an average size of 60 mesh U.S. Sieve size. The gasifier operating temperature was about 1800° F. and operating pressure was about 45 psi. Fluidizing gas comprised air, providing an oxygen concentration of about 8 volume percent, and steam to produce a low Btu product gas. Withdrawal gas comprising about 15 volume percent oxygen was introduced and passed through the selective withdrawal conduit constriction at a velocity of 33 feet per second. The presence of limestone did not interfere with the normal gasification yielding satisfactory product gas composition and carbon conversion nor with ash agglomerating operation of the gasifier. Ash agglomerates were withdrawn from the venturi selective withdrawal conduit along with calcium sulfate fixed limestone and unreacted limestone.

During fluidized bed operation, samples were withdrawn from the fluidized bed and the venturi selective withdrawal conduit. These samples showed that in the fluidized bed sulfur was present predominantly as calcium sulfide (CaS) while in the venturi selective withdrawal conduit sulfur was present predominantly as calcium sulfate ($CaSO_4$), which is a stable and environmentally acceptable sulfur compound. These results do verify the conversion of harmful and/or unstable gaseous sulfur compounds produced during coal gasification to an environmentally acceptable solid form in a single, ash agomerating type fluidized bed gasifier.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein may be varied considerably without departing from the basic principles of the invention.

I claim:

1. A process for gasifying sulfur containing carbonaceous feed solids in a single bed maintained fluidized by fluidizing gas introduced through a perforated sloping bed support grid within a single gasification reactor having a density/size selective solids withdrawal conduit at a base portion of said bed with upflowing withdrawal gas comprising:

introducing sulfur containing carbonaceous feed solids susceptible to gasification and sulfur fixation agent particulates selected from the group consisting of metallic carbonate, metallic oxide, and mixtures thereof into said single fluidized bed, said fluidizing gas having low oxygen content relative to said withdrawal gas;

gasifying said sulfur containing carbonaceous feed solids in said fluidized bed at temperatures of about 800° to 2000° F. producing ash and product gas forming a reducing region in a major portion of said single fluidized bed, said product gas comprising gaseous sulfur compounds;

reacting said gaseous sulfur compounds with oxides of said sulfur fixation agent in said reducing region of said single fluidized bed to form an intermediate solid metallic sulfur compound;

reacting said intermediate solid metallic sulfur compound in an oxidizing region maintained at a base portion of said fluidized bed and the upper portion of said selective solids withdrawal conduit by said upflowing withdrawal gas having high oxygen content relative to said fluidizing gas to form a stable, particulate, environmentally acceptable sulfur-containing compound;

withdrawing from a headspace of said single gasification reactor product gas from which said gaseous sulfur compounds have been substantially removed; and withdrawing said ash and said stable, particulate, environmentally acceptable sulfur-containing compound from said single fluidized bed through said selective solids withdrawal conduit.

2. A process according to claim 1 wherein said fluidizing gas comprises 0 to about 21 volume percent oxygen.

3. A process according to claim 2 wherein said withdrawal gas comprises 5 to about 90 volume percent oxygen.

4. A process according to claim 1 wherein said fluidizing gas comprises 0 to about 15 volume percent oxygen.

5. A process according to claim 4 wherein said withdrawal gas comprises about 10 to about 70 volume percent oxygen.

6. A process according to claim 1 wherein said withdrawal gas has an oxygen concentration greater than about 5 volume percent higher than the oxygen concentration of said fluidizing gas.

7. A process according to claim 1 wherein said carbonaceous feed solids comprise coal.

8. A process according to claim 1 wherein said sulfur fixation agent particulates are selected from the group consisting of: limestone, dolomite, siderite, oxides of iron, oxides of zinc, and mixtures thereof.

9. A process according to claim 1 wherein said sulfur fixation agent particulates are selected from the group consisting of calcium carbonate, calcium oxide, and mixtures thereof.

10. A process according to claim 9 wherein said gaseous sulfur compounds comprise hydrogen sulfide and carbonyl sulfides; said intermediate particulate sulfur compound comprises calcium sulfide; and said stable, particulate, environmentally acceptable sulfur-containing compound comprises calcium sulfate.

11. A process according to claim 9 wherein said calcium to said sulfur molar ratios introduced to said fluidized bed are about 1:1 to about 5:1.

12. A process according to claim 4 wherein said calcium to said sulfur molar ratios introduced to said fluidized bed are about 1:5 to 3:0.

13. A process according to claim 1 wherein said sulfur fixation agent particulates are provided in an amount to achieve molar ratios of metal to sulfur of about 1:1 to about 5:1 in said fluidized bed.

14. A process according to claim 13 wherein said sulfur fixation agent particulates are provided in an amount to achieve normal molar ratios of metal to sulfur of about 1.5:1 to about 3:1 in said fluidized bed.

15. A process according to claim 1 wherein solids residence time in said reducing region of said fluidized bed is about ⅓ hour to about 3 hours.

16. A process according to claim 1 wherein solids residence time in said reducing region of said fluidized bed is about ½ hour to about 1½ hours.

17. A process according to claim 1 wherein solids residence time in said oxidizing region is about 3 to about 20 minutes.

18. A process according to claim 1 wherein solids residence time in said oxidizing region is about 5 to about 10 minutes.

19. A process according to claim 1 wherein said carbonaceous feed solids comprise coal; said sulfur fixation agent particulates are selected from the group consisting of calcium carbonate, calcium oxide, and mixtures thereof; said calcium to said sulfur molar ratios introduced to said fluidized bed are about 1:1 to about 5:1; said withdrawal gas comprises about 10 to about 70 volume percent oxygen; said fluidizing gas comprises 0 to about 15 volume percent oxygen; solids residence time in said reducing region of said fluidized bed is about ⅓ hour to about 3 hours; and solids residence time in said oxidizing region is about 3 to about 20 minutes.

20. In a process for gasifying sulfur containing carbonaceous feed solids in a single bed maintained fluidized by fluidizing gas introduced through a perforated sloping bed support grid within a single gasification reactor having a density/size selective solids withdrawal conduit at a base portion of said bed with upflowing withdrawal gas, said gasifying producing ash and product gas forming a reducing region in a major portion of said single fluidized bed, said product gas comprising gaseous sulfur compounds, the improvement comprising: introducing sulfur fixation agent particulates selected from the group consisting of metallic carbonate, metallic oxide, and mixtures thereof into said fluidized bed, said fluidizing gas having low oxygen content relative to said withdrawal gas; reacting said gaseous sulfur compounds with oxides of said sulfur fixation agent in said reducing region of said single fluidized bed to form an intermediate solid metallic sulfur compound; and reacting said intermediate solid metallic sulfur compound in an oxidizing region maintained at a base portion of said fluidized bed and the upper portion of said selective solids withdrawal conduit by said upflowing withdrawal gas having high oxygen content relative to said fluidizing gas to form a stable, particulate, environmentally acceptable sulfur-containing compound.

21. A process according to claim 20 wherein said fluidizing gas comprises 0 to about 21 volume percent oxygen.

22. A process according to claim 21 wherein said withdrawal gas comprises 5 to about 90 volume percent oxygen.

23. A process according to claim 20 wherein said fluidizing gas comprises 0 to about 15 volume percent oxygen.

24. A process according to claim 23 wherein said withdrawal gas comprises about 10 to about 70 volume percent oxygen.

25. A process according to claim 20 wherein said withdrawal gas has an oxygen concentration greater than about 5 volume percent higher than the oxygen concentration of said fluidizing gas.

26. In a process according to claim 20 wherein said sulfur fixation agent particulates are selected from the group consisting of: limestone, dolomite, siderite, oxides of iron, oxides of zinc, and mixtures thereof.

27. In a process according to claim 20 wherein said sulfur fixation agent particulates are selected from the group consisting of calcium carbonate, calcium oxide, and mixtures thereof.

28. In a process according to claim 27 wherein said gaseous sulfur compounds comprise hydrogen sulfide and carbonyl sulfide; said intermediate particulate sulfur compound comprises calcium sulfide; and said stable, particulate, environmentally acceptable sulfur-containing compound comprises calcium sulfate.

29. In a process according to claim 20 wherein said sulfur fixation agent particulates are provided in an amount to achieve molar ratios of metal to sulfur of about 1:1 to about 5:1 in said fluidized bed.

30. In a process according to claim 20 wherein solids residence time in said reducing region of said fluidized bed is about ⅓ hour to about 3 hour.

31. In a process according to claim 20 wherein solids residence time in said oxidizing region is about 3 to about 20 minutes.

32. In a process according to claim 20 wherein said carbonaceous feed solids compise coal, said sulfur fixation agent particulates are selected from the group consisting of calcium carbonate, calcium oxide, and mixtures thereof, said calcium to said sulfur molar ratios introduced to said fluidized bed are about 1:1 to about 5:1, solids residence time in said reducing region of said fluidized bed is about ⅓ hour to about 3 hours, said fluicizing gas comprises 0 to about 21 volulme percent oxygen, said withdrawal gas comprises abut 5 to about 90 volume percent oxygen, and solids residence time in said oxidizing region is about 3 to about 20 minutes.

* * * * *